United States Patent [19]

Stromberg et al.

[11] Patent Number: 6,153,300
[45] Date of Patent: Nov. 28, 2000

[54] BLEACHING CELLULOSE PULP HAVING CLEANLINESS WHICH VARIES SIGNIFICANTLY OVER TIME USING AT LEAST TWO DIFFERENT BLEACHING STAGES AND BLEACHING CHEMICALS

[75] Inventors: C. Bertil Stromberg, Glens Falls; Patrick E. Sharpe, Queensbury; Louis O. Torregrossa, Queensbury; Joseph R. Phillips, Queensbury, all of N.Y.

[73] Assignee: Ahlstrom Machinery, Inc., Glens Falls, N.Y.

[21] Appl. No.: 08/229,086

[22] Filed: Apr. 18, 1994

[51] Int. Cl.[7] ...................................................... D02G 3/00
[52] U.S. Cl. ......................... 428/393; 428/392; 428/394; 428/398; 428/400; 428/364; 8/109; 8/111; 8/116; 8/115; 162/37; 162/65; 162/78; 162/6; 162/91; 162/123; 162/157.6; 162/202; 162/410
[58] Field of Search .................................. 162/37, 31, 65, 162/123, 60, 202, 44, 43, 78, 76, 5, 410, 66, 88, 89, 68, 57, 91, 157.6; 8/108 R, 109, 111, 115.52, 444, 116.1; 428/342, 393, 394, 398, 400, 364

[56] References Cited

U.S. PATENT DOCUMENTS

| | | | |
|---|---|---|---|
| 2,070,893 | 5/1937 | Glass | 8/2 |
| 2,478,379 | 8/1949 | Dodson et al. | 8/105 |
| 3,586,599 | 6/1971 | Yordson et al. | 162/67 |
| 4,487,656 | 12/1984 | Allan | 162/73 |
| 4,576,609 | 3/1986 | Hageman et al. | 8/103 |
| 5,217,575 | 6/1993 | Backlund | 162/65 |
| 5,234,544 | 8/1993 | Naddeo | 162/5 |
| 5,360,514 | 11/1994 | Henricson et al. | 162/31 |

FOREIGN PATENT DOCUMENTS

| | | |
|---|---|---|
| 1308913 | 10/1992 | Canada . |
| 0 379 858 A3 | 8/1990 | European Pat. Off. . |
| 0 514 901 A2 | 11/1992 | European Pat. Off. . |
| 0 557 651 A1 | 9/1993 | European Pat. Off. . |
| 4 050 391 | 2/1992 | Japan . |

OTHER PUBLICATIONS

LaFreniere et al, "Bleaching Processes for ONP/OMG, MOW . . . ", CPPA, Jan. 31–Feb. 4, 1994, pp. A39–A57.
Sharpe et al, "The Bleaching of Colored Recycled Fibers", TAPPI Pulping Conf., Nov. 14–18, 1993, pp. 1205–1217.
Forsberg et al "Bleaching Mixed Office Waste to High Brightness", TAPPI Pulping Conf., Nov. 14–18, 1993, pp. 1219–1229.

*Primary Examiner*—Merrick Dixon
*Attorney, Agent, or Firm*—Nixon & Vanderhye P.C.

[57] ABSTRACT

Recycled paper pulp having at least two different types of paper which consume widely different amounts of bleaching chemical, or mixed hardwood and soft-wood pulps, are treated in a manner that enhances distribution and redistribution of bleaching chemical to enhance uniformity of the bleaching treatment. The pulp is intensely mixed to provide a homogenous mixture of fibrous material and bleaching chemical, and then is continuously or intermittently subjected to mechanical action (such as in low intensity mixers, or by agitating pulp in a retention tank) of sufficient intensity and duration so as to enhance distribution and redistribution of a bleaching chemical. Also, recycled pulp will have cleanliness which varies significantly over time, and this is accommodated by sensing at least one of the brightness, color, or lignin content (e.g. all three) of the pulp prior to treatment in a first bleaching stage, controlling the quantity of first bleaching chemical added to the first stage in response to at least one of the brightness, color, or lignin content sensing to achieve a target brightness increase for the first stage, and then repeating the sensing and quantity control steps for a second and subsequent stages. Alternatively all sensing can be done initially. Within a stage, a valve may be controlled to subject the pulp to a second treatment in that stage, or to pass it out of the stage to the next stage, depending upon cleanliness.

19 Claims, 2 Drawing Sheets

BLEACHING CELLULOSE PULP HAVING CLEANLINESS WHICH VARIES SIGNIFICANTLY OVER TIME USING AT LEAST TWO DIFFERENT BLEACHING STAGES AND BLEACHING CHEMICALS

BACKGROUND AND SUMMARY OF THE INVENTION

In the production of paper pulp, there are a number of circumstances in which the comminuted cellulosic fibrous material to be bleached to produce the pulp has cleanliness which varies significantly over time. For example, one of the primary concerns when attempting to recover usable material from recycled paper is the uncontrollable variability of the quality and cleanliness of the furnish (waste paper) supplied. Paper collected by waste collectors and delivered to recycling mills is rarely screened to provide a uniform quality of furnish, and the cost of screening the paper manually or by automated sorter can significantly increase the price of the waste paper. The problem with the variability of the furnish is that it directly affects the quality of the pulp produced, and the cost of bleaching chemical is directly related to the cleanliness of the furnish. Depending upon the quality (typically its brightness or kappa number) of the furnish different bleaching chemical charges are necessary.

In conventional pulp mills, changes in brightness and kappa are limited, and variations of chemical charges can be made relatively easily utilizing conventional closed loop controls. However the unpredictability of recycled furnish is not amenable to simple closed loop control of chemical charges, and may require significantly different bleaching sequences or vastly different chemical charges or treatments.

According to the present invention, a method and apparatus are provided which provide the versatility necessary to a bleaching operation to accommodate variations in cleanliness of the furnish over time. The method of bleaching according to this aspect of the invention utilizes at least first and second different bleaching stages, using first and second different effective bleaching chemicals. While non-chlorine chemicals (e.g. oxygen, peroxide, ozone, formamidine sulfinic acid (FAS), hydrosulfite, peracetic acid, and enzyme treatments are preferred, the invention is not limited to non-chlorine bleaching chemicals but is also applicable to chlorine, chlorine dioxide, or equivalent bleaching chemicals. This aspect of the method according to the present invention comprises the following steps: (a) Sensing the brightness, color or lignin content (or any combination thereof) of the comminuted cellulosic fibrous material prior to treatment in the first bleaching stage. (b) Controlling the quantity of first bleaching chemical added to the first stage in response to the sensing from step (a) to achieve a target brightness increase for treatment of the material in the first stage. (c) Sensing at least one of the brightness, color or lignin content of the comminuted cellulosic fibrous material after treatment in the first bleaching stage and before treatment in the second stage. And, (d) controlling the quantity of second bleaching chemical added to the second stage in response to the sensing from step (c) to achieve a target brightness increase for treatment of the material in the second stage. The invention also relates to the cellulose pulp produced by this process.

Preferably steps (a) and (c) are further practiced to sense the pH of the material, and steps (b) and (d) are further practiced to add supplementary chemicals to the material, as needed, to obtain substantially optimum conditions in each of the bleaching stages for the particular bleaching chemical utilized. Typically there is at least a third bleaching stage after the second stage, and the method comprises the further steps of: (e) sensing at least one of the brightness, color or lignin content, and the pH, of the material after treatment in the second stage and before treatment in the third stage, and (f) in response to the sensing from step (e), controlling the quantity of bleaching chemical and supplementary chemicals added to the third stage to achieve a desired brightness.

The entire bleaching sequence and chemical charge in the basic method described above can be optionally determined by the sensing of step (a) without further sensing between treatments.

In order to provide a greater variety for treatment, at least one of the bleaching stages has at least a first and second high intensity mixers with chemical addition to each, and there is the further step, in response to sensing in step (a) or step (c), of controlling the flow of material so that it passes only through the first mixer with first chemical addition, or passes through the first and second mixers with chemical addition in each, before the material passes to the next stage.

The first and second bleaching chemicals come from first and second chemical supplies, and the method typically comprises the further steps of sensing the concentration of the chemicals in each of the chemical supplies, and using this information in determining how much chemical to add to the material in the practice of steps (b) and (d). Also there may be the further step of sensing at least one of the brightness, color, or lignin content (e.g. all three) of the material after the last bleaching stage, and using this information to adjust the chemical additions in at least one of the stages for subsequent material being bleached.

Steps (a) and (c) may also be further practiced to sense the $L^*$, $a^*$, or $b^*$ indicators of the comminuted cellulosic fibrous material, and steps (b) and (d) may be further practiced to utilize the sensing the $L^*$, $a^*$, or $b^*$ indicators to enhance treatment of the material. As described in the publication "The Measurement and Control of Optical Properties of Paper" by Popsen et al (Technidyne Corporation, New Albany, Ind.), $L^*$ is an indication of lightness or darkness, $a^*$ is an indication of "greenness" or "redness", and $b^*$ is an indication of "yellowness" or "blueness". With respect to pulp bleaching, "$L^*$" is analogous to ISO or GE brightness; a high $L^*$ value is desirable. At the same time a value of "$a^*$" and "$b^*$" approaching zero is desirable, i.e., as little color as possible. At the present time laboratory scale instrumentation is available to determine these indices (available from Technidyne Corporation), and instrumentation is available for paper machine applications, however on-line indicators for industrial application to pipelines or washers are not believed commercially available. However such on-line equipment is technically feasible and may be utilized in the practice of the invention in place of laboratory scale instrumentation once developed.

The invention also relates to apparatus for bleaching material having cleanliness which vary significantly over time. The apparatus comprises the following elements: A first bleaching stage, and a second bleaching stage. First means for sensing at least one of the brightness, color or lignin content of the comminuted cellulosic fibrous material prior to treatment in the first bleaching stage. Means for controlling the quantity of first bleaching chemical added to the first stage in response to the first sensing means to achieve a target brightness increase for treatment of the material in the first stage. Second means for sensing at least one of the brightness, color or lignin content of the comminuted cellulosic fibrous material after treatment in the first bleaching stage and before treatment in the second stage. And, means for controlling the quantity of second bleaching chemical added to the second stage in response to the second sensing means to achieve a target brightness increase for treatment of the material in the second stage.

The invention also deals with a somewhat related problem that occurs when a stream of pulp to be bleached has different components which consume vastly different amounts of bleaching chemical, differences great enough to result in non-uniform consumption of bleaching chemical. Again this typically occurs in recycled paper utilization facilities where the furnish is often a combination of white paper which typically has a kappa number of less than twenty, often less than ten, and sometimes less than one; colored paper which typically has a higher kappa number than white paper, brown paper which has a much higher kappa number (e.g. over 60), and newsprint, which has a very high kappa number (typically over 100). According to the invention it has been found that when material with such widely varying lignin contents is continuously or intermittently subjected to mechanical action, such as by utilizing a low intensity mixture or a series of low intensity mixers, and/or a retention vessel with one or more agitators, the bleaching results are vastly improved. The method according to this aspect of the invention comprises the following steps: (a) Intensely mixing a first stream of comminuted cellulosic fibrous material having at least two significant (i.e. at least 20% of the total weight) components which consume large differences in bleaching chemical (i.e. at least a kappa number difference of at least four and typically over 10) with bleaching chemical to provide a substantially homogenous mixture of fibrous material and bleaching chemical. And, (b) continuously or intermittently subjecting the mixture to mechanical action of sufficient intensity and duration so as to enhance distribution and redistribution of bleaching chemical in the fibrous material to enhance the uniformity of chemical distribution in the fibrous material until the bleaching action of the bleaching chemical is substantially complete. The invention also relates to an improved pulp produced by this process.

After step (b), steps (a) and (b) can be repeated for a number of other different (or the same) bleaching chemicals, such as the non-chlorine bleaching chemicals described earlier, or chlorine containing chemicals. While the invention is particularly applicable to mixtures of white recycled paper with other types of paper, it also can be used for mixtures of hardwood and softwood virgin fibers which themselves have vastly different lignin contents. Of course the recycled paper is re-pulped, deinked and cleaned before being treated.

The invention also relates to an apparatus for bleaching material having two significant components which consume large differences in bleaching chemical. This apparatus typically comprises means for intensely mixing a first stream of comminuted cellulosic fibrous material having at least two significant components which consume large differences in bleaching chemical with bleaching chemical to provide a substantially homogenous mixture of fibrous material and bleaching chemical; and means for continuously or intermittently subjecting the mixture to mechanical action of sufficient intensity and duration so as to enhance distribution and redistribution of bleaching chemical in the fibrous material to enhance the uniformity of chemical distribution in the fibrous material until the bleaching action of the bleaching chemical has substantially terminated. The means for intensely mixing typically comprises a high shear mixer such as a Kamyr, Inc. MC® mixer, or an Ahlmix™ mixer. The low intensity mixing means preferably comprises a plurality of in-series low intensity mixers, either a static or moving parts type, and/or a retention vessel with at least one agitator.

It is the primary object of the present invention to provide for the improved bleaching of comminuted cellulosic fibrous material having cleanliness which vary significantly over time and/or having at least two significant components which consume large differences in bleaching chemical. This and other objects of the invention will become clear from an inspection of the detailed description of the invention, and from the appended claims.

DETAILED DESCRIPTION OF THE DRAWINGS

Figure 1:
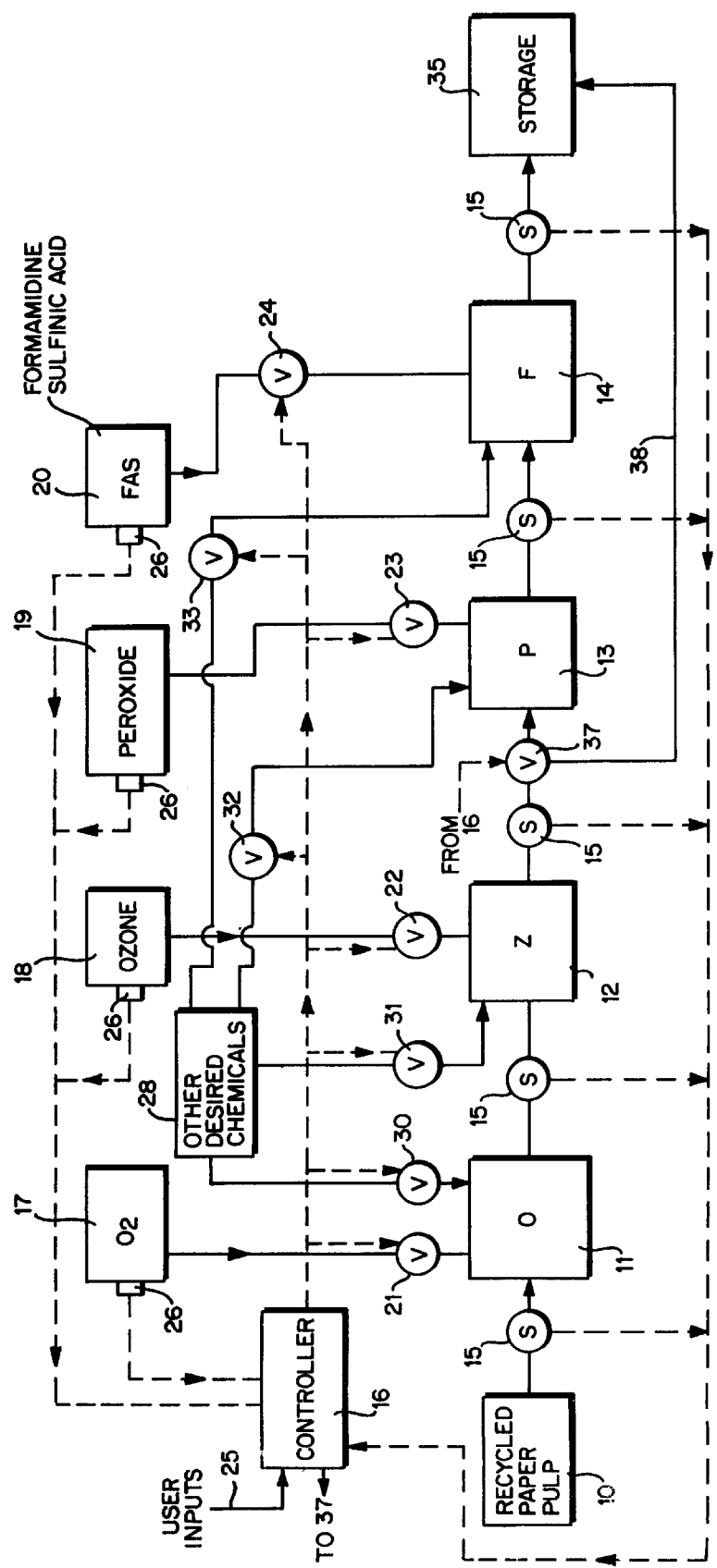
FIG. 1 is a schematic view illustrating exemplary apparatus according to the invention for practicing a method of bleaching pulp having cleanliness which varies significantly over time utilizing a plurality of different bleaching stages.

FIG. 1 shows an exemplary bleaching sequence that may be used according to the present invention with paper pulp furnish 10 which preferably comprises recycled paper pulp which has been re-pulped, deinked, and cleaned using conventional equipment. While the source of pulp 10 may alternatively be virgin pulp, the invention is particularly applicable to recycled pulp, which typically includes a mixture of recycled paper such as white recycled paper, colored paper, brown paper, and/or newsprint.

In FIG. 1 a particular bleaching sequence OZPF is illustrated, the O bleaching stage 11 of course being oxygen bleaching (delignification), the Z stage 12 being ozone bleaching, the P stage 13 being peroxide bleaching, and the F (FAS) stage 14 being formamidine sulfinic acid treatment. Prior to each stage 11 through 14, and also preferably after the last stage 14, are one or more sensors 15. The sensors 15 are conventional on-line brightness, color or lignin content (or combination thereof) sensors which can determine brightness, color and/or lignin content of the pulp on-line. The sensors 15 also preferably include conventional pH on-line sensors which are useful in determining how to vary the pulp pH in order to optimize bleaching for any particular stage. Also, or alternatively, the sensors 15 can be sensors for CIE (i.e Commission Internationale de l'Eclairage) color indices, i.e. for sensing the indices L*, a*, and b*. Such sensors are presently laboratory scale instrumentation available from Technidyne Corporation of New Albany, Ind., however when on-line versions of such sensors are developed they also will be readily utilizable according to the invention.

The sensors 15 are connected to a conventional computer controller 16, known as a distributive control system, which controls the additions of chemicals to each of the stages 11 through 14 depending upon the brightness or other characteristics of the pulp prior to and/or after each of the stages 11 through 14. The controller 16 typically controls both bleaching chemical supplies, as well as supplies of other desired chemicals such as for controlling the pH, for protecting the fiber during bleaching, etc.

Various bleaching chemical supplies utilized with the stages 11 through 14 are shown in FIG. 1 at 17 through 20.

The chemical supply 17 is oxygen, the supply 18 is ozone, the supply 19 is peroxide, and the supply 20 is formamidine sulfinic acid. Between each of the chemical supplies 17–20 and the associated stage 11–14 is an automatically operated metering valve, or the like, 21–24, respectively, all controlled by the controller 16. Not only are the inputs from the sensors 15 supplied to the controller 16, but other inputs are supplied as well. For example, user inputs for setting targets for the particular brightness achieved by each stage, or at the end of the bleaching, production rate, and other inputs, are provided at 25. Also, in case the concentration of the chemical within each of the supplies 17–20 may vary, a concentration indicator 26 may be associated with each of the supplies 17–20, and data from the concentration indicators 26 is provided to the controller 16.

FIG. 1 also schematically illustrates a supply 28 of other chemicals. The other chemicals 28 most often are pH adjusting chemicals such as caustic, mild acids, or the like, or cellulose protectors and bleaching chemical stabilizers, such as magnesium sulfate, sodium silicate, or chelant (such as DTPA or EDTA); however these are only exemplary, and whatever chemicals are necessary for optimized bleaching in each of the stages 11 through 14 may be provided in the supply 28. The supply 28 is shown schematically connected to each of the stages 11 through 14 by valves 30–33, respectively.

Typically the stages 11–14 are single stages with post stage washing, although they also may be multiple stages. For example ozone supply and control may be similar to that disclosed in co-pending application Ser. No. 07/989,932 filed Dec. 7, 1992 (atty. dkt. 10-789). The peroxide stage may be as disclosed in co-pending application Ser. No. 08/144,869 filed Nov. 3, 1993 (atty. dkt. 30-249). The inter-stage washing may also be omitted. While the stages preferably treat the pulp at medium consistency (e.g. about 6–16%, typically about 10%), they also can treat the pulp at different consistencies (e.g. low consistency, such as 1–2%), or at high consistency (especially in the case of ozone or oxygen) if suitable dewatering and thickening equipment is utilized. After treatment, the pulp typically passes to storage as indicated schematically at 35 in FIG. 1.

In an exemplary practice of the method according to the present invention using re-pulped, deinked, and cleaned mixed office waste, results in the following Table I were achieved. Table I shows the results of laboratory bleaching trials on eight samples of varying composition of white paper, colored paper, brown paper, and newsprint, collectively known as "mixed office waste" (MOW). The initial kappa number, brightness, color indices and fluorescence for each sample are given, although for the purposes of the present analysis only the ISO brightness value is considered in comparing the data. Each sample was bleached using an OZPF non-chlorine bleaching sequence, and the conditions and resulting brightness and color are listed for each stage.

Kamyr - L30051 (MT)
Bleaching of Different MOW Mixtures with OZPF
Starting material:
Delinked Mixed Office Waste (Low kappa white component)

| Mixture # | A1 | A2 | A3 | A4 | A5 | A6 | A7 | A8 |
|---|---|---|---|---|---|---|---|---|
| White, % (0.8 Kappa) | 60 | 85 | 85 | 88 | 80 | 95 | 45 | 78 |
| Color, % (5.3 kappa) | 40 | 15 | — | — | — | — | 40 | 15 |
| Brown, % (54 kappa) | — | — | 5 | 2 | — | — | 5 | 2 |
| Newsprint, % (111 kappa) | — | — | — | — | 10 | 5 | 10 | 5 |
| initial Kappa # | 2.2 | 1.4 | 3.9 | 2.2 | 12.5 | 7.5 | 16 | 9.1 |
| Brightness, ISO | 85.0 | 74.6 | 67.5 | 75.5 | 71.7 | 76.6 | 54.3 | 66.1 |
| CIE: | | | | | | | | |
| - L* | 89.5 | 92.5 | 89.0 | 91.8 | 89.8 | 81.7 | 84.2 | 88.7 |
| - a* | −0.18 | 0.1 | 1.08 | 0.81 | 0.04 | 0.13 | 0.48 | 0.19 |
| - b* | 8.9 | 5.7 | 5.7 | 3.7 | 3.7 | 2.8 | 9.9 | 6.4 |
| Fluorescence | 0.62 | 1.07 | 0.83 | 1.18 | 0.72 | 1.00 | 0.27 | 0.58 |
| O2-Stage: 10% cons., 60 min, 95° C., 90 psig O2 | | | | | | | | |
| NaOH, % | 2 | 2 | 2 | 2 | 2 | 2 | 2 | 2 |
| MgSO4, % | 0.6 | 0.5 | 0.5 | 0.5 | 0.5 | 0.5 | 0.5 | 0.5 |
| End pH | 12.3 | 12.6 | 12.2 | 11.7 | 11.8 | 12.2 | 10.7 | 11.5 |
| Kappa number | 1.7 | 1.4 | 2.5 | 1.4 | 11.7 | 6.5 | 13.4 | 7.1 |
| Brightness, ISO | 73.0 | 79.5 | 72.1 | 79.3 | 64.4 | 71.8 | 57.2 | 66.0 |
| CIE: | | | | | | | | |
| - L* | 93.0 | 94.6 | 92.2 | 94.4 | 80.5 | 92.7 | 87.6 | 90.9 |
| - a* | −0.44 | −0.17 | 0.29 | 0.07 | −0.72 | −0.62 | −1.12 | −0.35 |
| - b* | 8.0 | 5.5 | 7.5 | 6.3 | 11.2 | 8.5 | 12.9 | 10.5 |
| Fluorescence | 0.45 | 0.77 | 0.67 | 0.66 | 0.23 | 0.36 | 0.17 | 0.28 |
| Z-Stage: room temp., 1% cons., pH adjusted to 2.5 | | | | | | | | |
| H2SO4, % | 4.4 | 5.9 | 4.6 | 4.7 | 4.9 | 5.1 | 3.3 | 3.2 |
| Target O3 on pulp, % | 1 | 1 | 1 | 1 | 1 | 1 | 1 | 1 |
| O3 consumed, % on pulp | 1.1 | 1.1 | 1.15 | 1.15 | 1.16 | 1.1 | 1.17 | 1.19 |
| Brightness, ISO | 85.4 | 89.1 | 90.5 | 91.8 | 79.2 | 86.4 | 71.4 | 82.9 |
| CIE: | | | | | | | | |
| - L* | 96.4 | 97.2 | 97.3 | 97.6 | 94.7 | 96.4 | 93.0 | 95.7 |
| - a* | −1.13 | −0.74 | −0.30 | −0.27 | −0.88 | −0.66 | −1.68 | −0.93 |
| - b* | 4.1 | 2.7 | 2.0 | 1.4 | 6.0 | 3.3 | 9.5 | 4.8 |
| Fluorescence | 0.17 | 0.23 | 0.34 | 0.32 | 0.16 | 0.20 | 0.10 | 0.12 |
| White, % (0.8 Kappa) | 60 | 85 | 86 | 98 | 90 | 95 | 45 | 78 |
| Color, % (5.3 kappa) | 40 | 15 | — | — | — | — | 40 | 15 |
| Brown, % (54 kappa) | — | — | 5 | 2 | — | — | 6 | 2 |
| Newsprint, % (111 kappa) | — | — | — | — | 10 | 5 | 10 | 6 |
| OZ-Stage (see Table 12) | | | | | | | | |
| Brightness, ISO | 85.4 | 89.1 | 90.5 | 91.8 | 79.2 | 86.4 | 71.4 | 82.9 |
| CIE: | | | | | | | | |
| - L* | 96.4 | 97.2 | 97.3 | 97.6 | 94.7 | 96.4 | 93.0 | 95.7 |
| - a* | −1.13 | −0.74 | −0.30 | −0.27 | −0.88 | −0.56 | −1.68 | −0.93 |
| - b* | 4.1 | 2.7 | 2.0 | 1.4 | 6.0 | 3.3 | 9.5 | 4.8 |
| Fluorescence | 0.17 | 0.23 | 0.34 | 0.32 | 0.16 | 0.20 | 0.10 | 0.12 |
| P-Stage: 2 hrs, 70° C., 10% cons. | | | | | | | | |
| MgSO4, % | 0.5 | 0.5 | 0.5 | 0.5 | 0.5 | 0.5 | 0.5 | 0.5 |
| NaSillcate, % | 1 | 1 | 1 | 1 | 1 | 1 | 1 | 1 |
| DTPA, % | 0.2 | 0.2 | 0.2 | 0.2 | 0.2 | 0.2 | 0.2 | 0.2 |
| NaOH, % | 1.2 | 1.2 | 1.2 | 1.2 | 1.2 | 1.2 | 1.2 | 1.2 |
| H2O2, % | 1 | 1 | 1 | 1 | 1 | 1 | 1 | 1 |
| End pH | 11.3 | 11.4 | 11.5 | 11.4 | 10.6 | 11.1 | 10.0 | 11 |
| Residual % H2O2 | 0.8 | 0.88 | 0.59 | 0.72 | 0.72 | 0.77 | 0.67 | 0.89 |
| Brightness, | 87.8 | 90.2 | 92.1 | 92.3 | 85.2 | 89.9 | 76.5 | 86.3 |

-continued

Kamyr - L30051 (MT)
Bleaching of Different MOW Mixtures with OZPF
Starting material:
Delinked Mixed Office Waste (Low kappa white component)

| Mixture # | A1 | A2 | A3 | A4 | A5 | A6 | A7 | A8 |
|---|---|---|---|---|---|---|---|---|
| ISO CIE: | | | | | | | | |
| – L* | 97.0 | 97.3 | 97.6 | 97.6 | 96.0 | 97.0 | 94.6 | 96.3 |
| – a* | –0.77 | –0.40 | –0.10 | –0.05 | –0.8 | –0.35 | –1.69 | –0.72 |
| – b* | 3.3 | 2.0 | 1.2 | 1.0 | 3.6 | 1.9 | 8.0 | 8.2 |
| Fluorescence | 0.19 | 0.26 | 0.40 | 0.38 | 0.36 | 0.48 | 0.12 | 0.17 |
| F-Stage: 30 min, 60° C., 10% cons. | | | | | | | | |
| FAS, % | 1 | 1 | 1 | 1 | 1 | 1 | 1 | 1 |
| NaOH, % | 0.6 | 0.6 | 0.6 | 0.6 | 0.6 | 0.6 | 0.6 | 0.6 |
| End pH | 10.2 | 10.2 | 10.7 | 9.7 | 10.0 | 9.7 | 10.7 | 10.3 |
| Brightness, | 91.1 | 92.6 | 93.3 | 93.9 | 88.2 | 90.9 | 80.8 | 89.7 |
| ISO CIE: | | | | | | | | |
| – L* | 97.8 | 97.9 | 97.9 | 98.0 | 86.9 | 97.4 | 95.8 | 97.3 |
| – a* | –0.65 | –0.30 | –0.06 | –0.02 | –0.73 | –0.37 | –1.70 | –0.66 |
| – b* | 2.2 | 1.3 | 0.8 | 0.6 | 3.0 | 1.9 | 6.5 | 2.5 |
| Fluorescence | 0.31 | 0.41 | 0.42 | 0.52 | 0.46 | 0.42 | 0.40 | 0.43 |

Table I indicates that the extent of bleaching necessary to achieve a desired brightness varies widely depending upon the composition of the recycled paper furnish, and target brightness. For example, if a minimum 80 ISO brightness is desired in the final product, merely an OZ sequence is necessary for samples A1, A2, A3, A4, A6, and A8. Under these circumstances, either the P and F stages may be bypassed completely by utilizing a diverting valve 37 and conduit 38 (see FIG. 1), or no active bleaching chemical is added at all in the stages 13, 14. Given the same scenario as above, the chemical dosage may be reduced significantly for samples A2–A4 and the desired 80 brightness can still be comfortably achieved.

When viewing the higher kappa samples A5 and A7, however, it is seen that they require further treatment to achieve 80 brightness. Sample A5 achieves a greater than 80 brightness with an O-Z-P sequence. Similarly, some MOW pulps achieve 90 ISO brightness after only an OZ sequence where others require a complete OZPF sequence to achieve 90 brightness. Some higher kappa samples, e.g. A5, A7 and A8 cannot achieve 90 brightness even with the full sequence used for these tests (although 90 brightness might be achieved by varying the bleaching conditions used).

This illustrates that different recycle paper furnishes require different bleaching sequences or grossly different chemical charges to achieve the desired brightness in the product. Since the composition and quality control available in recycled papers is limited, without extreme expense, a recycled fiber mill which produces bleached pulp must be able to effectively accommodate a broad range of paper compositions. The present invention provides the versatility in bleaching operation that is expressly suited to accommodate such variation in waste paper furnish.

Figure 2:
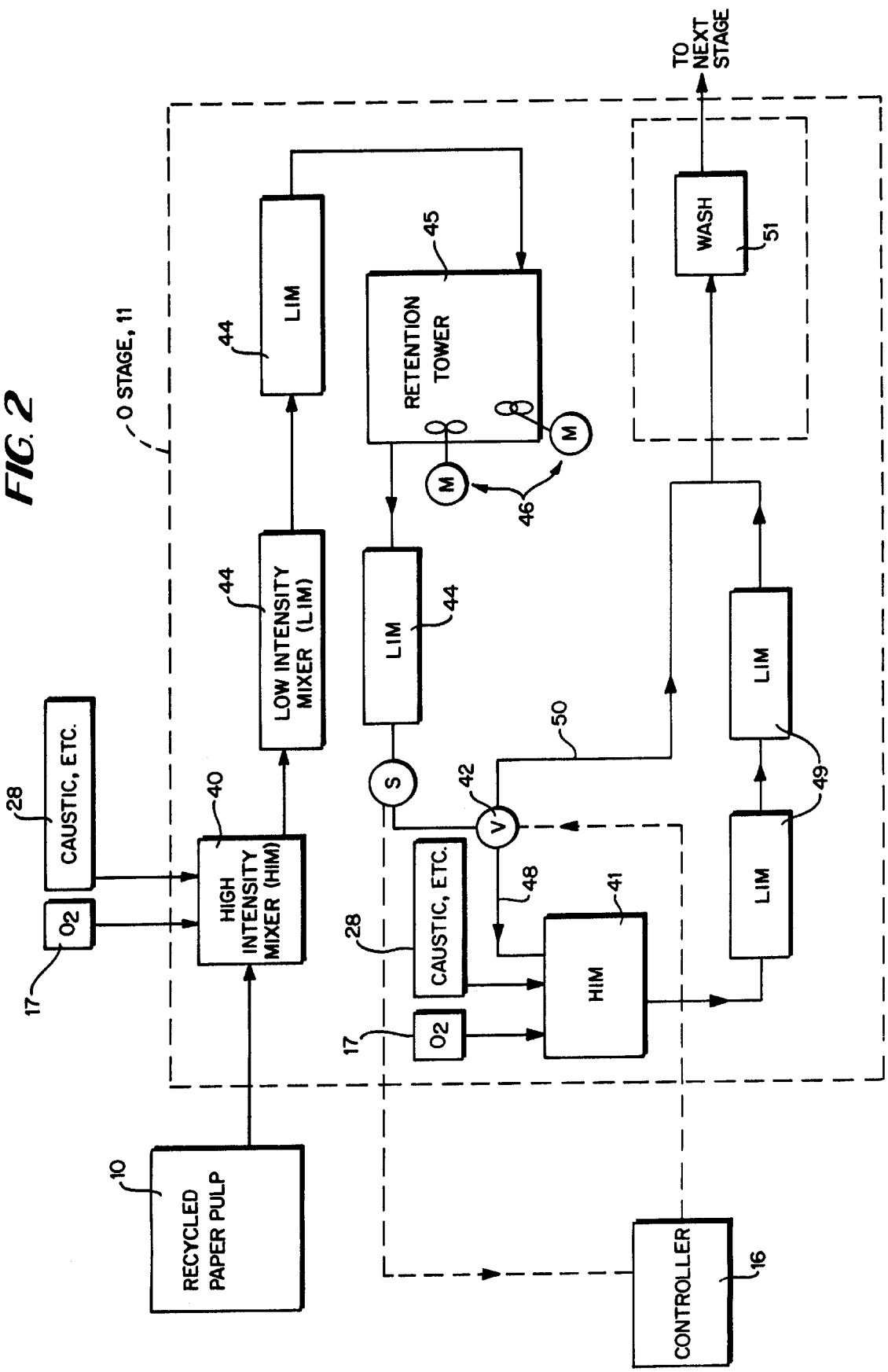
FIG. 2 is a detail schematic view of one of the stages of FIG. 1, showing apparatus according to the invention for practicing a method of the invention for vastly improving uniformity of the consumption of bleaching chemical and the efficiency of the bleaching.

FIG. 2 illustrates schematically apparatus that may be utilized in one or more of the stages 11–14, not only for accomplishing the objectives described earlier, but also to enhance the versatility of the system and to provide much more uniform chemical consumption. While FIG. 2 illustrates equipment for the O stage 11, it is to be understood that similar equipment can be provided for the other stages 12 through 14, or other types of stages that might be utilized such as chlorine, chlorine dioxide, hypochlorite, or like stages.

Bleaching is accomplished in the stage 11 by passing the recycled paper pulp to the high intensity mixer 40, at which the active bleaching chemical, oxygen in this case, from the supply 17 is added, as well as caustic or other necessary or optimizing chemicals from the source 28. The high intensity mixer (HIM) 40 preferably comprises a high shear mixer such as a Kamyr, Inc. "MC®" mixer, or an Ahlmix™ mixer from A. Ahlstrom Corporation. The high intensity mixer 40 intensely mixes the recycled paper pulp with the bleaching and other chemicals to provide a substantially homogeneous mixture of fibrous material and bleaching chemical. Then the pulp is held for a sufficient retention time (which varies widely depending upon what the bleaching chemical and other conditions are) before the stage is completed. However in keeping with the desire, according to the present invention, to provide flexibility and treatment in view of the widely varying cleanliness of the paper from the source 10, the stage 11 may include at least a second HIM 41, and an automatically controlled (by the controller 16) diverter valve 42 for either passing some or all of the pulp after the first oxygen treatment to the second mixer 41, or directly to the next stage.

FIG. 2 also illustrates additional apparatus according to the present invention which greatly improves the uniformity of the consumption of bleaching chemical even when the pulp being treated has at least two significant (i.e. at least 20% of the total volume) components which consume greatly different amounts of bleaching chemical, (i.e. having at least a kappa number difference of four, and typically at least ten, e.g. a kappa number difference of at least 20%), such as white paper mixed with newspaper [white paper having a kappa number of less than twenty (often less than ten, and sometimes less than one), while the newspaper has a kappa number of over 100 (e.g. 111 in the example of Table I)]. This increase in uniformity of consumption of bleaching chemical for such a pulp has surprisingly been found to be achievable by using a series of low intensity mixers and/or a retention tower with one or more agitators. A series of low intensity mixers 44 are illustrated between the high intensity mixer 40 and the valve 42, and a retention tower 45, having two agitators 46 therein, is also shown. The low intensity mixers 44 may be static mixers or contain rotating mixing elements, such as auger mixers or blade mixers, or can be of any other suitable type which applies a mechanical action to the pulp so as to enhance distribution and redistribution of bleaching chemical to enhance the uniformity of the chemical distribution, while not adversely affecting fibers of the pulp. After the valve 42, the pulp either branches in line 48 to the second HIM 41 and then to a second series of LIMs 49 (or the like), or all or a part of it is passed in line 50 directly to the wash apparatus 51 for completion of the stage and discharge to the next stage (e.g. a Z stage 12).

The advantageous results that are achievable by providing mechanical action on pulp having two significant components with large differences in lignin content are indicated by Table II. It has been found that the advantageous results according to the invention are particularly applicable where the recycled pulp has a high lignin content or kappa number, e.g. greater than 15.

| Karnyr - L30051 (LG) Bleaching with PF and mechanical action | | | | | |
|---|---|---|---|---|---|
| Starting Material: | Mixed Office waste paper (Screened & Deinked) White component - 0.8 Kappa | | | | |
| Composite Name | A9a | | | | |
| White, % | 49 | | | | |
| Color, % | 30 | | | | |
| Brown, % | 1 | | | | |
| Groundwood, % | 20 | | | | |
| Kappa No. | 25.7 | | | | |
| Viscosity, mPa · s | 12.1 pi | | | | |
| Initial Brightness, ISO | 52.7 | | | | |
| Color CIE: | | | | | |
| L* | 82.3 | | | | |
| a* | 0.07 | | | | |
| b* | 8.9 | | | | |
| Fluorescence | 0.25 | | | | |
| Sample No.: | 1 | 2 | 3 | 4 | 5 |
| P-Stage: 120 min. 70° C., 10% cons | hand mix | mixer w/N2 | bag | bomb* w/N2 | bag |
| $H_2O_2$, % | 2.0 | 2.0 | 2.0 | 2.0 | 2.0 |
| $MgSO_4$, % | 0.5 | 0.5 | 0.5 | 0.5 | 0.5 |
| NaSilicate, % | 1.0 | 1.0 | 1.0 | 1.0 | 1.0 |
| NaOH, % | 1.1 | 1.1 | 1.1 | 1.1 | 1.1 |
| DTPA, % | 0.2 | 0.2 | 0.2 | 0.2 | 0.2 |
| N2 pressure, psig | — | purge | — | 80 | — |
| Final pH | 11.1 | 10.6 | 11.2 | 10.6 | 10.9 |
| Residual $H_2O_2$, % on pulp | 0.12 | 0.14 | 0.13 | 0.15 | 0.15 |
| Brightness, ISO | 63.4 | 59.8 | 61.7 | 64.0 | 62.0 |
| Color CIE: | | | | | |
| L* | 88.3 | 85.8 | 87.1 | 88.3 | 87.3 |
| a* | -1.3 | -1.1 | -1.3 | -1.3 | -1.2 |
| b* | 8.4 | 7.4 | 8.0 | 7.9 | 7.8 |
| Fluorescence | 0.25 | 0.29 | 0.38 | 0.51 | 0.43 |
| F-Stage 30 min. 60° C., 10% cons | hand mix | mixer w/N2 | bag | bomb* w/N2 | bomb* w/N2 |
| FAS, % | 1.0 | 1.0 | 1.0 | 1.0 | 1.0 |
| NaOH, % | 0.6 | 0.6 | 0.6 | 0.6 | 0.6 |
| N2 pressure, psig | — | purge | — | 80 | 80 |
| Final pH | 8.7 | 8.1 | 9.2 | 9.2 | 9.1 |
| Brightness, ISO | 69.5 | 68.9 | 66.6 | 68.9 | 69.4 |
| Color CIE: | | | | | |
| L* | 89.7 | 89.4 | 88.4 | 89.2 | 89.8 |
| a* | -1.3 | -1.2 | -1.4 | -1.4 | -1.4 |
| b* | 5.4 | 5.3 | 5.7 | 5.0 | 5.3 |
| Fluorescence | 0.50 | 0.44 | 0.45 | 0.45 | 0.49 |
| Viscosity, mPa · s | 11.7 pi | 11.2 pi | 11.5 pi | 11.9 pi | 12.1 pi |

*That is a rotating bomb.

The results of mechanical action in laboratory tests on screened and deinked MOW appear in Table II. This table shows the results of a P-F bleaching sequence performed with varying amounts of mechanical action. For sample 1, the pulp and chemical were placed in a sealed plastic bag and kneaded by hand every five to ten minutes for both stages. For sample 2, the pulp and chemical were placed in a sealed laboratory mixer which was rotated slowly for both stages. The mixture was purged with nitrogen gas. For sample 3, the pulp and chemical were placed in a sealed plastic bag, kneaded once initially and then allowed to sit untouched for the duration of each stage. For sample 4, the pulp and chemical were placed in a sealed plastic bag and the bag was placed in a sealed container, or rotating "bomb". The bomb was pressurized with nitrogen to 80 pounds and rotated continuously for both stages. For sample 5, the bag procedure of sample 3 was used for the P stage and the bomb procedure of sample 4 was used for the F stage. The relative amount of mechanical action was minimum for sample 3. The other samples received variable amounts of mechanical action.

The results show that mechanical action of any kind produced a pulp with a higher brightness than the pulp for the sample that had the least mechanical action (sample 3). This demonstrates that the continuous or intermittent use of mechanical action improves the efficiency of the bleaching reaction. This may be caused by the continuous exposure of lignin-laden fiber to the bleaching chemical that does not occur after only an initial mixing. This is particularly effective for recycled pulps containing a higher ground wood content, i.e., having more lignin. The mechanical action, introduced continuously or intermittently, improves the distribution or redistribution of bleaching chemical to produce a more uniform chemical distribution and removal of chromophores.

While the invention has been specifically described with respect to recycled paper, it is to be understood that it is also applicable to virgin fiber which has mixed species of vastly different (e.g. at least 10% different) lignin content, such as soft-wood and hardwood mixtures.

In addition to providing a versatile bleaching procedure that can accommodate a broad range of recycled furnishes, this system also provides feedback for billing of waste paper suppliers. In a recycled fiber mill, the wastepaper supplier is typically requested to provide a specified limited content of white paper, newsprint, etc. Based upon those limits the cost of bleaching chemicals required to produce a specific brightness can be determined. Any additional chemical cost incurred due to a "dirtier" furnish can be recovered by billing the waste paper supplier. This will help to control the quality of the furnish supplied by the waste paper supplier.

It will thus be seen that according to the present invention a method and apparatus have been provided which greatly enhance the ability to bleach comminuted cellulosic fibrous material having cleanliness which varies significantly over time, and/or having at least two significant components which consume large differences in bleaching chemical, producing an improved pulp. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods, pulps, and apparatus.

What is claimed is:

1. A bleached cellulose pulp produced from comminuted cellulosic fibrous material having cleanliness which varies significantly over time, by practicing the steps of:
   (a) sensing at least one of the brightness, color, or lignin content of the comminuted cellulosic fibrous material prior to treatment in the first bleaching stage;
   (b) controlling the quantity of first bleaching chemical added to the first stage in response to the sensing from step (a) to achieve a target brightness increase for treatment of the material in the first stage;
   (c) sensing at least one of the brightness, color, or lignin content of the comminuted cellulosic fibrous material after treatment in the first bleaching stage and before treatment in the second stage; and
   (d) controlling the quantity of second bleaching chemical added to the second stage in response to the sensing from step (c) to achieve a target brightness increase for treatment of the material in the second stage.

2. A method of bleaching comminuted cellulosic fibrous material having cleanliness which varies significantly over time using at least first and second different bleaching stages, using first and second different effective bleaching chemicals, comprising the steps of:

(a) sensing at least one of the brightness, color, or lignin content of the comminuted cellulosic fibrous material prior to treatment in the first bleaching stage;

(b) controlling the quantity of first bleaching chemical added to the first stage in response to the sensing from step (a) to achieve a target brightness increase for treatment of the material in the first stage;

(c) sensing at least one of the brightness, color, or lignin content of the comminuted cellulosic fibrous material after treatment in the first bleaching stage and before treatment in the second stage; and (d) controlling the quantity of second bleaching chemical added to the second stage in response to the sensing from step (c) to achieve a target brightness increase for treatment of the material in the second stage.

3. A method as recited in claim 2 wherein steps (a) and (c) are further practiced to sense the pH of the material, and wherein steps (b) and (d) are further practiced to add supplementary chemicals to the material, as needed, to obtain substantially optimum conditions in each of the bleaching stages for the particular bleaching chemical utilized.

4. A method as recited in claim 3 in which there is at least a third bleaching stage after the second stage, and comprising the further steps of: (e) sensing at least one of the color, brightness or lignin content, and the pH, of the material after treatment in the second stage and before treatment in the third stage, and (f) in response to the sensing from step (e), controlling the quantity of bleaching chemical and supplementary chemicals added to the third stage to achieve a desired brightness.

5. A method as recited in claim 2 wherein at least one of the bleaching stages has at least first and second high intensity mixers with chemical addition to each of the mixers; and comprising the further step, in response to sensing in step (a) or step (c), of controlling the flow of material so that it passes only through the first mixer with chemical addition in the first mixer, or passes through the first and second mixers with chemical addition in each, before the material passes to the next stage.

6. A method as recited in claim 2 wherein steps (a) and (c) are further practiced to sense the L*, a*, or b* CIE indicators of the material, and wherein steps (b) and (d) are further practiced to utilize the sensing of the L*, a*, or b* indicators to enhance treatment of the material.

7. A method as recited in claim 2 wherein the material has at least two significant components which have Kappa number differences of at least 4, which consume large differences in bleaching chemical, and wherein each of steps (b) and (d) are practiced to: (i) intensely mix the comminuted cellulosic fibrous material having at least two significant components which consume large differences in bleaching chemical with bleaching chemical to provide a substantially homogenous mixture of fibrous material and bleaching chemical; and (ii) continuously subject the mixture to mechanical action of sufficient intensity and duration so as to enhance distribution and redistribution of bleaching chemical in the fibrous material to enhance the uniformity of chemical distribution in the fibrous material until the bleaching action of the bleaching chemical has substantially terminated.

8. A method as recited in claim 2 wherein step (a) is practiced using re-pulped, deinked and cleaned recycled paper comprising a mixture of white recycled paper having a kappa number of less than 20 with at least one of colored paper, brown paper, and newsprint, each having a kappa number at least 20% greater than the white recycled paper.

9. A method as recited in claim 8 wherein steps (a) and (c) are further practiced to sense the L*, a*, or b* CIE indicators of the material, and wherein steps (b) and (d) are further practiced to utilize the sensing of the L*, a*, or b* indicators to enhance treatment of the material.

10. A method as recited in claim 5 wherein steps (a) and (c) are further practiced to sense the L*, a*, or b* CIE indicators of the material, and wherein steps (b) and (d) are further practiced to utilize the sensing of the L*, a*, or b* indicators to enhance treatment of the material.

11. A method as recited in claim 3 wherein steps (a) and (c) are further practiced to sense the L*, a*, or b* CIE indicators of the material, and wherein steps (b) and (d) are further practiced to utilize the sensing of the L*, a*, or b* indicators to enhance treatment of the material.

12. A method as recited in claim 3 wherein at least one of the bleaching stages has at least first and second high intensity mixers with chemical addition to each of the mixers; and comprising the further step, in response to sensing in step (a) or step (c), of controlling the flow of material so that it passes only through the first mixer with first chemical addition, or passes through the first and second mixers with chemical addition in each, before the material passes to the next stage.

13. A method as recited in claim 3 wherein the material has at least two significant components which have Kappa number differences of at least 4, which consume large differences in bleaching chemical, and wherein each of steps (b) and (d) are practiced to: (i) intensely mix the comminuted cellulosic fibrous material having at least two significant components which consume large differences in bleaching chemical with bleaching chemical to provide a substantially homogenous mixture of fibrous material and bleaching chemical; and (ii) continuously subject the mixture to mechanical action of sufficient intensity and duration so as to enhance distribution and redistribution of bleaching chemical in the fibrous material to enhance the uniformity of chemical distribution in the fibrous material until the bleaching action of the bleaching chemical has substantially terminated.

14. A method of bleaching comminuted cellulosic fibrous material having cleanliness which varies significantly over time using at least first and second different bleaching stages, using first and second different effective bleaching chemicals comprising the steps of:

(a) sensing at least one of the color, brightness or lignin content of the comminuted cellulosic fibrous material prior to treatment in the first bleaching stage;

(b) controlling the quantity of first bleaching chemical added to the first stage in response to the sensing from step (a) to achieve a target brightness increase for treatment of the material in the first stage; and (c) controlling the quantity of second bleaching chemical added to the second stage, and any subsequent stages, in response to the sensing from step (a) to achieve a target brightness increase for treatment of the material in the second stage, and any subsequent stages.

15. A method as recited in claim 14 wherein step (a) is practiced to sense all of the color, brightness and lignin content of the material.

16. A method as recited in claim 14 wherein step (a) is further practiced to sense the pH of the material, and wherein steps (b) and (c) are further practiced to add supplementary chemicals to the material, as needed, to obtain substantially optimum conditions in each of the bleaching stages for the particular bleaching chemical utilized.

17. A method as recited in claim 14 wherein step (a) is further practiced to sense the L*, a*, or b* CIE indicators of the material, and wherein steps (b) and (c) are further practiced to utilize the sensing of the L*, a*, or b* indicators to enhance treatment of the material.

18. A method as recited in claim 2 wherein the material has at least two significant components which have Kappa number differences of at least 4, which consume large differences in bleaching chemical, and wherein each of steps (b) and (d) are practiced to: (i) intensely mix the comminuted cellulosic fibrous material having at least two significant components which consume large differences in bleaching chemical with bleaching chemical to provide a substantially homogenous mixture of fibrous material and bleaching chemical; and (ii) intermittently subject the mixture to mechanical action of sufficient intensity and duration so as to enhance distribution and redistribution of bleaching chemical in the fibrous material to enhance the uniformity of chemical distribution in the fibrous material until the bleaching action of the bleaching chemical has substantially terminated.

19. A method as recited in claim 7 wherein steps (a) and (c) are further practiced to sense the L*, a*, or b* CIE indicators of the material, and wherein steps (b) and (d) are further practiced to utilize the sensing of the L*, a*, or b* indicators to enhance treatment of the material.

* * * * *